US007274891B2

(12) United States Patent
Murata

(10) Patent No.: US 7,274,891 B2
(45) Date of Patent: Sep. 25, 2007

(54) IMAGE FORMING APPARATUS AND PRINTING TIME SPECIFYING SYSTEM

(75) Inventor: Kazumi Murata, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 301 days.

(21) Appl. No.: 11/133,761

(22) Filed: May 19, 2005

(65) Prior Publication Data

US 2006/0263109 A1 Nov. 23, 2006

(51) Int. Cl.
*G03G 15/00* (2006.01)
*H04N 1/00* (2006.01)

(52) U.S. Cl. .......................... 399/82; 358/296; 399/85

(58) Field of Classification Search .................. 399/38, 399/42, 75, 81, 82, 83, 85; 358/296, 473
See application file for complete search history.

(56) References Cited

U.S. PATENT DOCUMENTS 5,587,799 A * 12/1996 Kawamura et al. ......... 358/296
6,125,249 A * 9/2000 Ootsuka et al. ............... 399/87

FOREIGN PATENT DOCUMENTS

JP 2002-307785 10/2002

* cited by examiner

*Primary Examiner*—Hoan Tran
(74) *Attorney, Agent, or Firm*—SoCal IP Law Group LLP; Steven C. Sereboff

(57) ABSTRACT

The image forming apparatus of this invention has a printing time specifying function, and includes: a printer unit configured to print an image on paper, which is transferred from a paper feed unit, in either a normal print mode or a high speed print mode; a time specifying processing unit configured to receive print data in which a printing time is specified, and schedule a printing time on the basis of the print data of the printing time; and a control unit configured to check the process schedule of the other print data in advance of starting the print process of the print data relating to the time specified printing, and perform the print process of the print data relating to the time specified printing and the print process of the other print data in the high speed print mode if it is estimated that the print process of the print data as time specified cannot be finished by the printing time as desired.

16 Claims, 6 Drawing Sheets

IMAGE FORMING APPARATUS AND PRINTING TIME SPECIFYING SYSTEM

BACKGROUND OF THE INVENTION

1. Field of the Invention

The present invention relates to an image forming apparatus such as an MFP (Multi-Function Peripherals) or a printer, and a printing time specifying system equipped with an image forming apparatus. More specifically, the present invention relates to an image forming apparatus having a printing time specifying function for finishing a print process by the time as specified by a user.

2. Description of the Related Art

In recent years, some image forming apparatuses are provided with a printing time specifying function for finishing a print process by the time convenient to a user. The printing time specifying function makes it possible to effectively use the image forming apparatus because a user can pick up printed paper by making a move after the time as specified.

For example, Japanese Patent Published Application No. Hei 2002-307785 describes a printer system which automatically starts printing in accordance with the finish time as specified by a user and ends the printing at the finish time, while the finish time of printing as specified is used to calculate the starting time from which printing starts with reference to the number of sheets of paper to be printed and the size of print data.

However, in accordance with the conventional technique as described above, if the finish time of printing is set by the printing time specifying function while another printing job has already been scheduled in advance, the time specified printing starts after finishing the previous printing job so that the finish of printing may be delayed after the specified finish time to make nonsense of specifying a printing time. Conversely, it can be considered to give priority to the time specified printing. However, in this case, another printing job is interrupted halfway such that it is inconveniently delayed until the time specified printing is finished.

DETAILED DESCRIPTION OF THE INVENTION

Throughout this description, the embodiments and examples shown should be considered as exemplars, rather than limitations on the apparatus and system of the present invention.

In what follows, with reference to drawings, an embodiment of the present invention will be explained in detail. Incidentally, like reference numbers indicate the same elements throughout the drawings.

Figure 1:
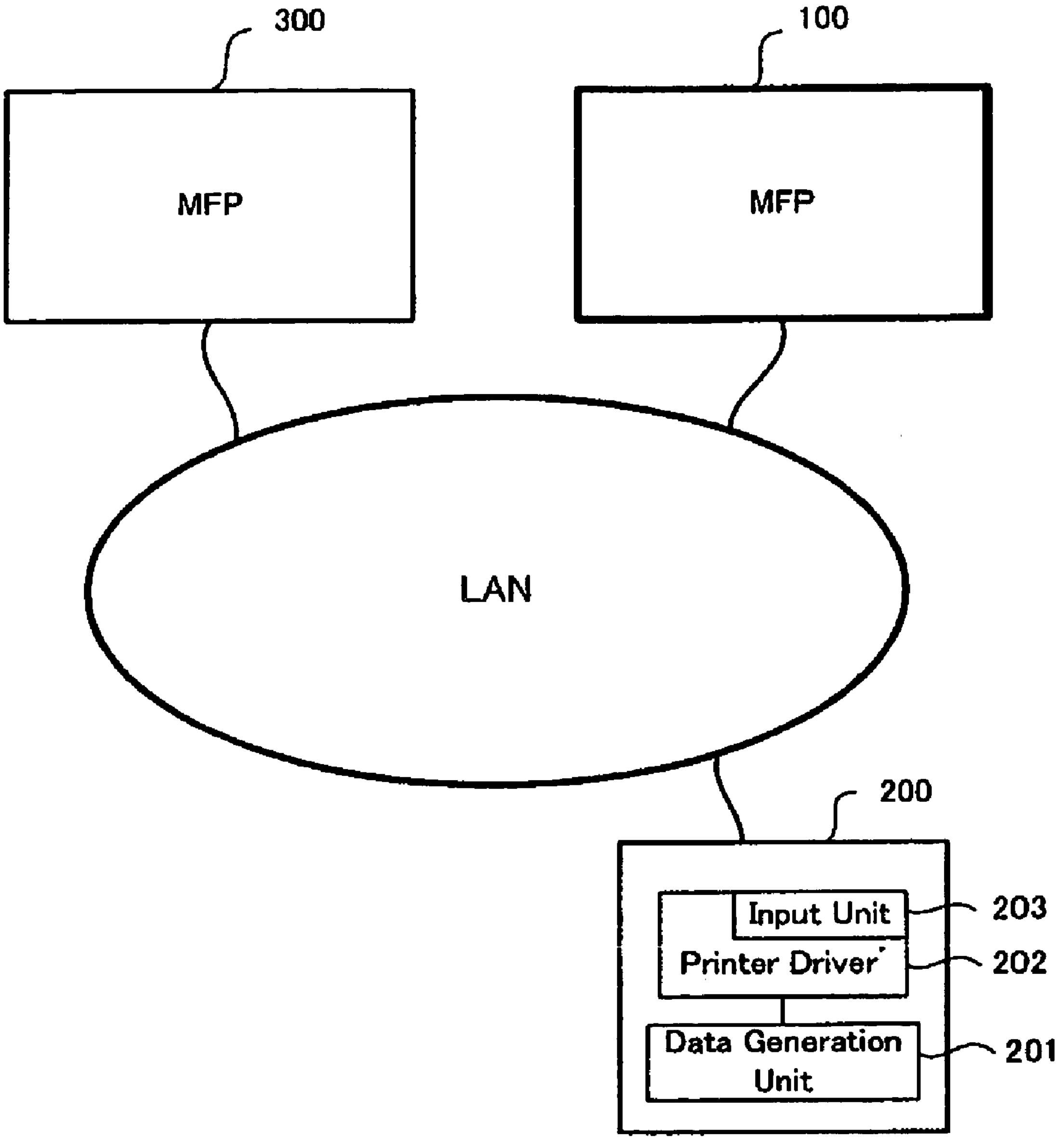
FIG. 1 is an explanatory view for showing a printing time specifying system and an image forming apparatus in accordance with an embodiment of the present invention.
Figure 2:
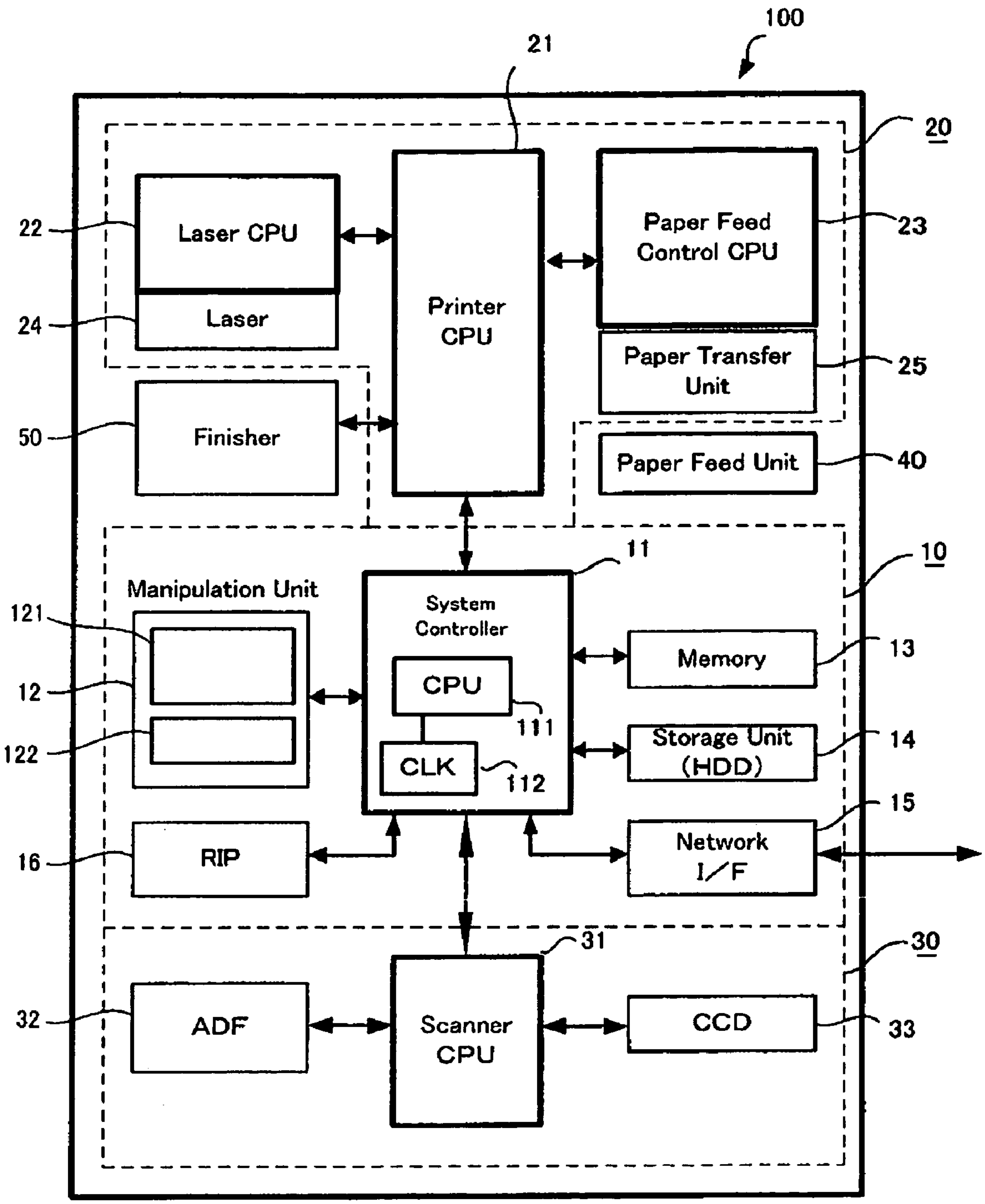
FIG. 2 is a block diagram showing the image forming apparatus in accordance with the embodiment of the present invention.
Figure 3:
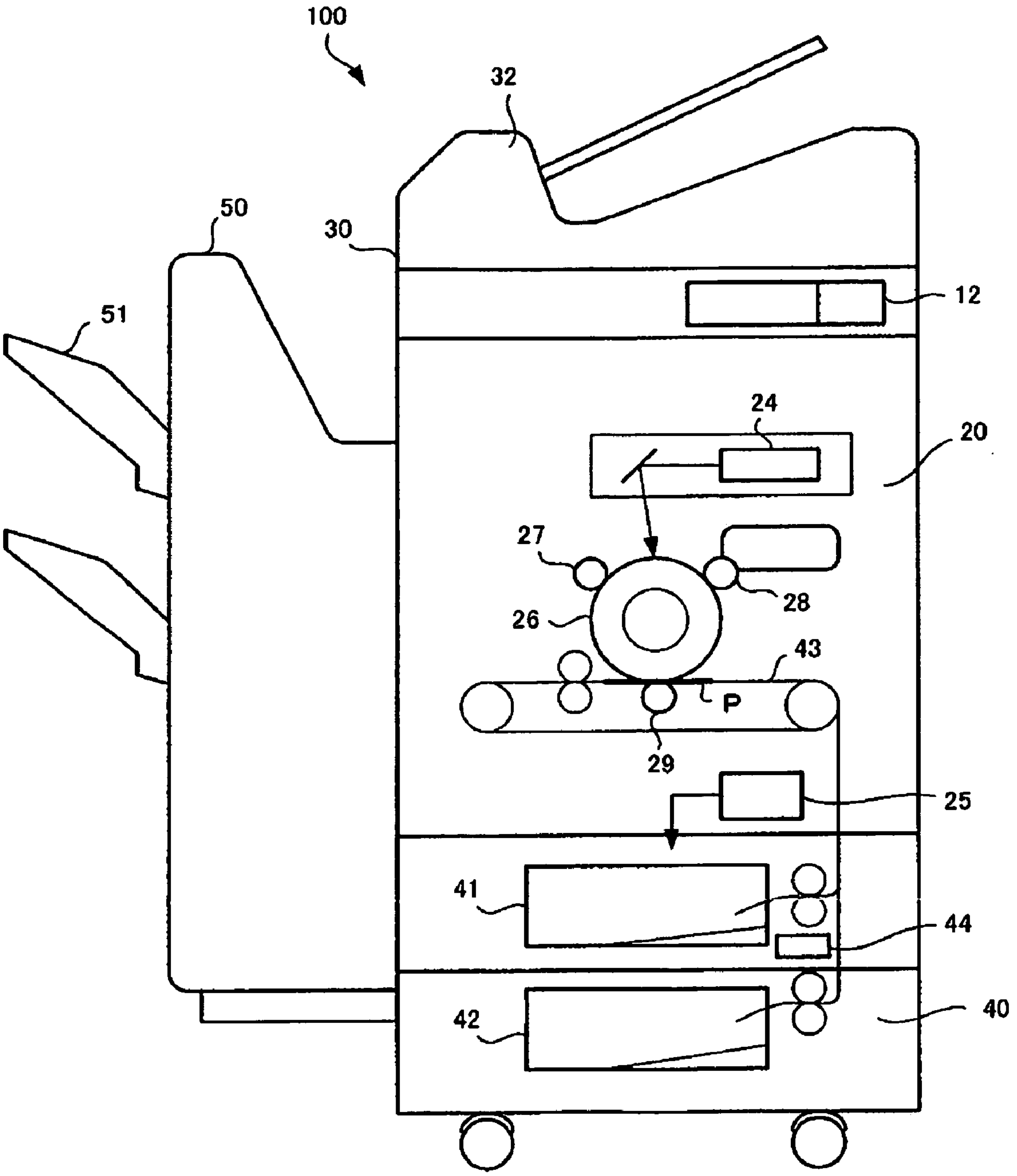
FIG. 3 is a schematic view mainly showing the mechanical configuration of the image forming apparatus in accordance with the embodiment of the present invention.

FIG. 1 shows a printing time specifying system equipped with an image forming apparatus in accordance with an embodiment of the present invention; FIG. 2 is a block diagram showing the primary portions of the image forming apparatus in accordance with the embodiment of the present invention; and FIG. 3 is a schematic view mainly showing the mechanical configuration of the image forming apparatus.

In the system configuration of FIG. 1, an image forming apparatus 100 is, for example, an MFP (Multi-Function Peripherals) which serves as a multifunctional center apparatus and connectable to an external device 200 such as a PC (Personal Computer) and another multifunctional center apparatus (MFP) 300 through a network such as a LAN (Local Area Network).

The external device 200 serves to provide print data and has a data generation unit 201 for preparing text and images by application software and a printer driver 202 for outputting print data from the data generation unit 201 to the image forming apparatus 100 through the network. Also, the printer driver 202 includes an input unit 203 for inputting information of time specified printing such as a print finish time.

A printing time is specified by inputting the size of paper, a reduce/enlarge ratio, the number of print copies, print modes such as single-side printing, and a print finish time through the input unit 203. Incidentally, in the following explanation, it is assumed that the external device 200 is a client PC.

FIG. 2 is a schematic diagram showing the overall configuration of the image forming apparatus 100 which is provided with an image data processing unit 10, a printer unit 20, a scanner unit 30, a paper feed unit 40 and a finisher 50. The image data processing unit 10 has a system controller 11 including software for controlling the operation of the entire system, a manipulation unit 12 connected to the system controller 11, a memory 13, and a storage unit 14 comprising a hard disk drive (HDD) and the like, and is further provided with a network interface (I/F) 15 for connecting it with the PC 200 and the like through the LAN, and a raster image processor (RIP) 16.

The system controllers 11 controls the entire operation of the image forming apparatus 100, and the manipulation unit 12 is provided with a display panel 121 and an input unit 122 which can be manipulated by a user for inputting the number of print copies, the size of paper and various instructions such as single-side or double-side printing to the system controller 11, and also inputting instructions relating to time specified printing.

The memory 13 comprises a ROM and a RAM connected to the system controller 11, while the ROM stores control program and the like and the RAM can provide a storage for saving temporary data. Also, the storage unit 14 is used to store data as processed by the image forming apparatus 100, data as processed in the form of a print file by the printer unit 20, print data and drawing image data transferred from the PC 200, and so forth. The RIP (raster image processor) 16 serves to the process of converting drawing data to raster data, the process of changing the resolution and so forth.

The printer unit 20 has a printer CPU 21, a laser CPU 22 and a paper feed control CPU 23. The respective CPUs 21, 22 and 23 are connected to each other, while the printer CPU 21 controls the operation of the printer unit 20 as well as the system controller 11.

The laser CPU 22 takes control of a laser 24 in order to control the laser output when a photoreceptor is scanned with a laser beam emitted from the laser 24 in order to generate an image. Also, the paper feed control CPU 23 controls a paper transfer unit 25 to adjust the paper feed timing and the transportation speed of paper, and feed paper in an appropriate way for single-side or double-side printing.

The scanner unit 30 includes a scanner CPU 31, an automatic document feeder (ADF) 32 and a CCD 33. The scanner CPU 31 controls the scanner unit 30 as well as the system controller 11. The scanner unit 30 irradiates an original on a flatbed plate with an exposure lamp, and the reflected light is received by a CCD 33 in order that the image of the original is scanned and converted into image data. Also, the ADF 32 serves to successively transport originals to the flatbed plate.

FIG. 3 is a schematic view mainly showing the mechanical configuration of the image forming apparatus 100 including the scanner unit 30, the ADF 32 and the manipulation unit 12 which are located in the upper portion, the printer unit 20 which is located in the middle portion, and the paper feed unit 40 which is located in the lower portion, and provided with the finisher 50 responsible for performing post processes such as a stapling process.

The printer unit 20 is a printer, for example a color laser printer of a tandem type, which serves to generate an image by scanning a photoreceptor with a laser beam emitted from the laser 24. Briefly speaking, an electrostatic latent image is generated by scanning and exposing the surface of a photoreceptor 26 to a laser beam, which is emitted from the laser 24 and reflected by a polygon mirror, in order to form a toner image by development while there are a charging unit 27, a development unit 28, a transfer unit 29 and the like respectively located around the photoreceptor drum 26. Also, the development unit 28 is supplied with toner from a toner cartridge.

The paper feed unit 40 is provided with a plurality of paper feed cassettes 41 and 42 capable of holding sheets of various sizes, and the paper transfer unit 25 picks up a sheet of the size as specified under the control of the paper feed control CPU 23 and transfers a sheet P from the paper feed cassettes 41 and 42 to the transfer belt 43. Also, there is a transfer motor 44 for successively transferring paper from the paper feed cassettes 41 and 42.

The finisher 50 serves to perform processing after outputting paper as printed by the printer unit 20, for example, the steps of stapling, punching and the like followed by placing paper in a catch tray 51.

In the case where a printing time specifying process is performed by inputting a printing time to the image forming apparatus of the present invention, the amount of time the print process would take is calculated on the basis of the size of print data, the number of print copies and the like such that the print process starts at the timing to finish printing by the printing time as specified. Also, in accordance with the present invention, if the previous print job takes lots of time while a printing time has been specified, or if another print job is scheduled before starting the print process as time specified such that the time specified printing may not be finished by the printing time as specified, the printing speed is increased in order to finish the time specified printing by the specified time.

Namely, if it is judged that the time specified printing seems not to be finished by the specified time by checking the print job currently performed at a predetermined timing after is the printing time is specified, the printing speed for the current print job is increased, and the print job as time specified is performed at a high speed so that the print finish time as specified is kept. Incidentally, the print job is a task required for the print process of data.

Figure 4:
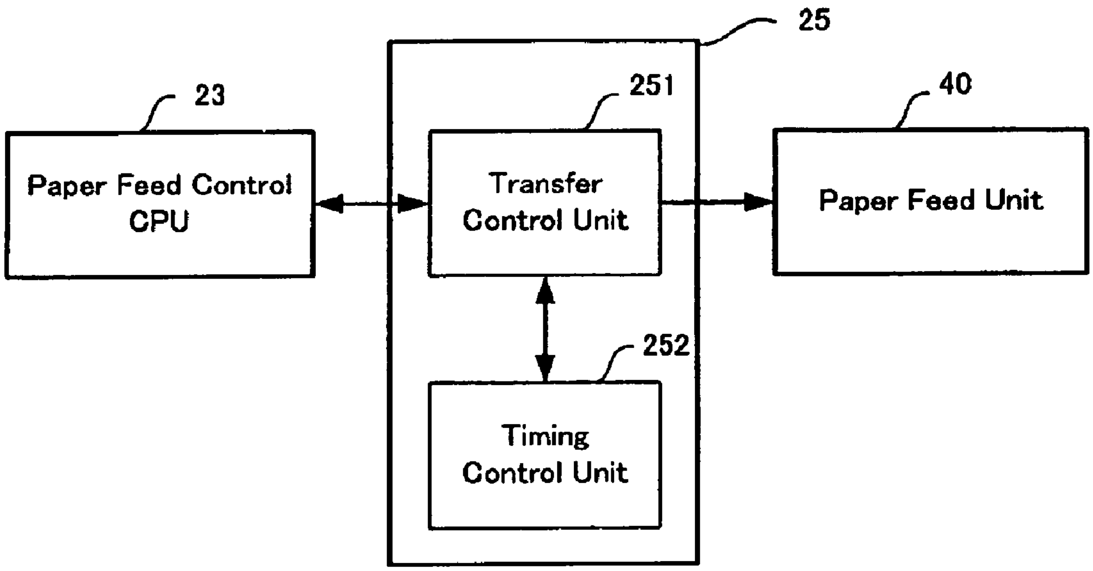
FIG. 4 is a block diagram showing a speedup processing unit for print process in accordance with the embodiment of the present invention.
Figure 5:
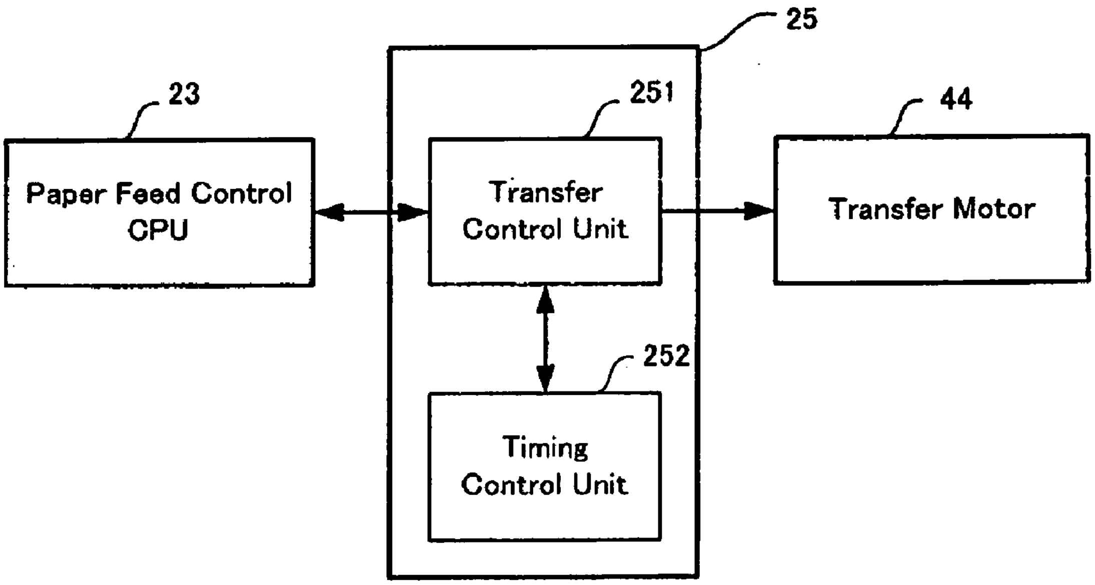
FIG. 5 is a block diagram showing examples of another speedup processing unit for print process in accordance with the embodiment of the present invention.

FIG. 4 and FIG. 5 are block diagrams showing examples of a speedup processing unit for print process.

FIG. 4 shows an example of shortening the interval of sheets transferred from the paper feed unit 40. The paper transfer unit 25 reduces the period of time between one sheet and the next as transferred from the paper feed unit 40 under the control of the paper feed control CPU 23. The paper transfer unit 25 comprises a transfer control unit 251 and a timing control unit 252. The processing time of the print process is determined by the number of sheets transferred, e.g., for each minute, such that, in the case where the transfer speed is fixed, the number of transferred sheets as overall throughput can be increased by reducing the interval of transferring sheets.

When the instruction to perform a high speed process is output from the printer CPU 21, the paper feed control CPU 23 takes control of the transfer control unit 251 to control the paper feed unit 40 to speed up the timing of feeding paper. The timing control unit 252 monitors the transfer timing of paper and transmits timing information to the paper feed control CPU 23 through the transfer control unit 251, while the paper feed control CPU 23 takes control of the respective units in order to perform the print process to keep pace with the timing of transferring paper. By this configuration, the high speed print process is performed by changing the interval of transferring paper from the interval at which paper is transferred with a print process throughput of 45 sheets per minute to the interval at which paper is transferred with a print process throughput of 60 sheets per minute. Also, when the instruction to perform the high speed process is removed, the normal transfer interval is resumed to perform the print process to pace with the normal feed timing.

FIG. 5 shows an example of increasing the speed of transferring paper from the paper feed unit 40. The paper transfer unit 25 increases the speed of transferring paper from the paper feed unit 40 under the control of the paper feed control CPU 23.

The paper transfer unit 25 comprises a transfer control unit 251 and a timing control unit 252 in the same manner as illustrated in FIG. 4, while the transfer control unit 251 controls the transfer motor 44 unlike the example of FIG. 4. In this example, when the instruction to perform the high speed process is output from the printer CPU 21, the paper feed control CPU 23 controls the transfer control unit 251 to increase the rotational speed of the transfer motor 44 of the paper feed unit 40 and increase the transfer speed.

The timing control unit 252 monitors the timing of transferring paper and transmits timing information to the paper feed control CPU 23 through the transfer control unit 251, while the paper feed control CPU 23 takes control of the respective units in order to perform the print process to keep pace with the timing of transferring paper. In this case, since the speed of transferring paper is increased, the high speed print process is performed by speeding up the print process to pace with the transfer speed.

FIG. 4 and FIG. 5 are similar in terms of controlling the speed of transferring paper, but differ in that the interval of transferring paper is reduced without changing the transfer speed in the case of FIG. 4 and that the transfer speed is increased without changing the interval of transferring paper in the case of FIG. 5, while the print process is speeded up in both cases.

Alternatively, the high speed print process can be realized as in the following examples. In one example, the clock frequencies of the CPUs and the like are increased (clock speedup) to increase the speed of processing the instructions and control signals of the CPUs, and shorten the print processing time. For example, while the system controller 11 of FIG. 2 is provided with a CPU 111 and a clock signal generation unit 112, the clock frequency is increased when a high speed process becomes necessary. Also, when the instruction to perform the high speed process is removed, the normal clock frequency is resumed. This scheme is effective in the case where the CPU performance is the bottleneck so that the processing time can be shortened by employing this scheme.

Also, the high speed print process can be implemented as reduction of the processing time in the RIP 16. For example, the data processing time for printing can be reduced by lowering the resolution of the image processed by the RIP 16. In this case, when the RIP 16 is given an instruction to perform the high speed process under the control of the CPU 111, the RIP 16 changes the resolution and the like used in processing images. Also, when the instruction to perform the high speed process is removed, the normal resolution is resumed.

On the other hand, when the time of printing is specified and the high speed process is needed, it is necessary to determine from what time the high speed process is to start. In other words, the system controller 11 needs to detect a print job given to the MFP 100. In what follows, the processes of detecting a job and changing the print process to the high speed print process will be explained with reference to FIG. 6A and FIG. 6B.

In the case where a job has already been registered in the MFP 100, the number of print copies and the like corresponding to all the print data can be managed in the MFP 100. Accordingly, the time required for performing the job can be calculated on the basis of the processing speed of the MFP 100 and the job properties such as the number of print copies, single-side or double-side printing and the size of sheets. In the case of the normal print process, while the process in the RIP 16 and the process of exchanging print data are concurrently performed to start printing (successive printing), if another print data is input during printing, this another print data is registered as a new job which is to start after the current print job, if any, is finished.

Figure 6A:
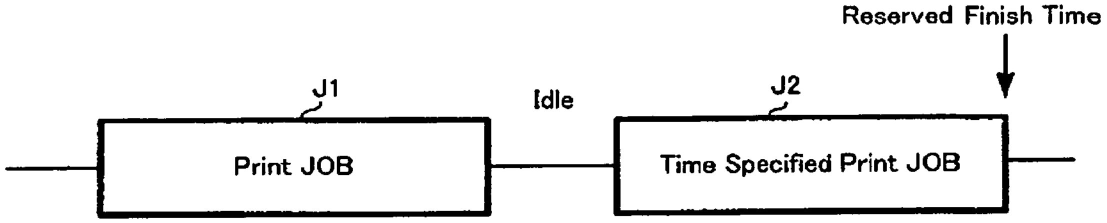
FIG. 6A is a view for explaining the normal print process of the image forming apparatus in accordance with the embodiment of the present invention.

FIG. 6A shows the case where another print job J1 is scheduled in advance of a time specified print job J2. In this case, while the current print job is checked at certain time intervals in advance of starting the time specified printing, if the processing time of the previous print job J1 is not so long, the time specified print job J2 is finished by the specified finish time by starting the job J2 after finishing the previous print job J1 and letting some time pass.

Figure 6B:
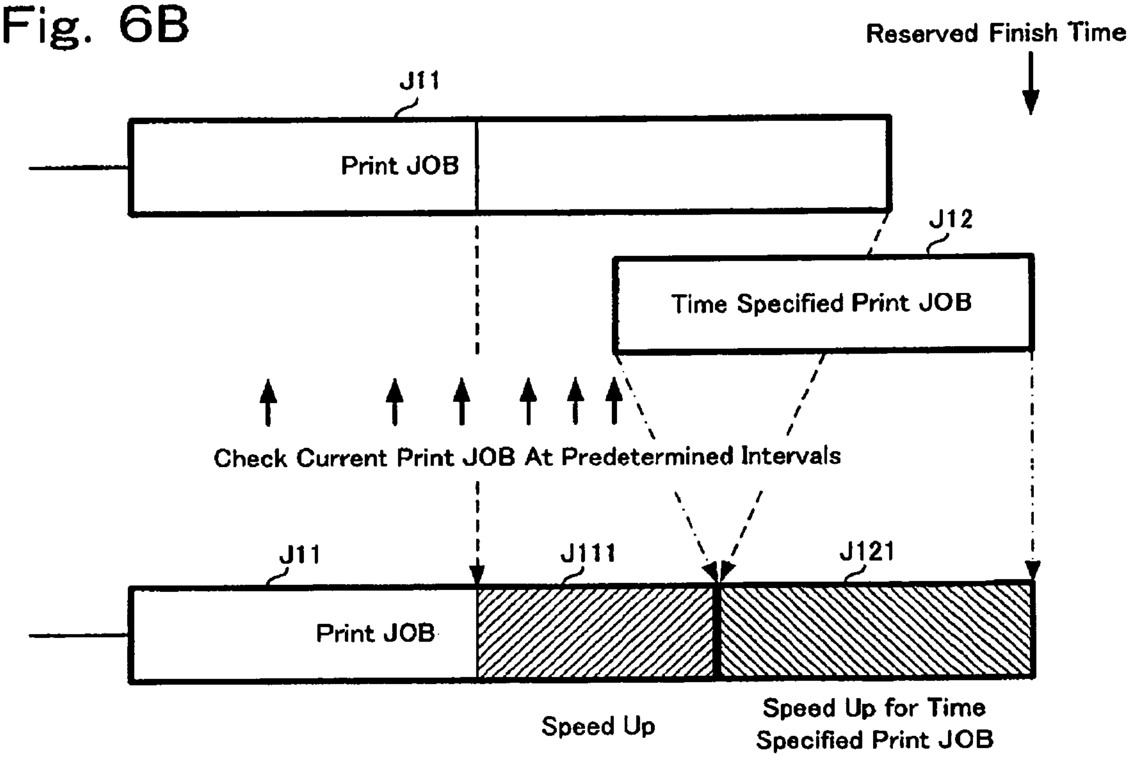
FIG. 6B is a view for explaining the high speed print process of the image forming apparatus in accordance with the embodiment of the present invention.

On the other hand, FIG. 6B shows the case where another print job J11 is scheduled in the MFP 100 in advance of a time specified print job J12 and the processing time of the previous print job J11 is long. In this case, since the number of print copies and the like corresponding to all the print data can be managed in the MFP 100, the time required for performing the previous print job J11 can be calculated on the basis of the processing speed of the MFP 100 and the number of print copies a so forth.

Accordingly, when the time of printing is specified, while the print job currently being performed is checked at certain time intervals in advance of starting the time specified printing, the print mode is changed to the high speed print mode if it is estimated that the previous print job J11 is not finished before the time when the time specified print job J12 is to start. The high speed print process is performed for the rest of the print job J11 which is being performed and the time specified print job J12 so that the time specified printing can be finished by the specified time. In FIG. 6B, the periods J111 and J121 are the periods of printing in the high speed mode.

Incidentally, the job check time interval becomes shorter as it get close to the time when the time specified printing is to start. For example, the job check time interval is shortened as 60 minutes, 45 minutes, 30 minutes, 20 minutes, 15 minutes, 10 minutes, 5 minutes, and just before the start time of the time specified printing, one minute. By this configuration, it is possible to determine the appropriate time point at which the high speed process starts.

The operation of the print process as described above will be explained with reference to the flowchart of FIG. 7.

Figure 7:
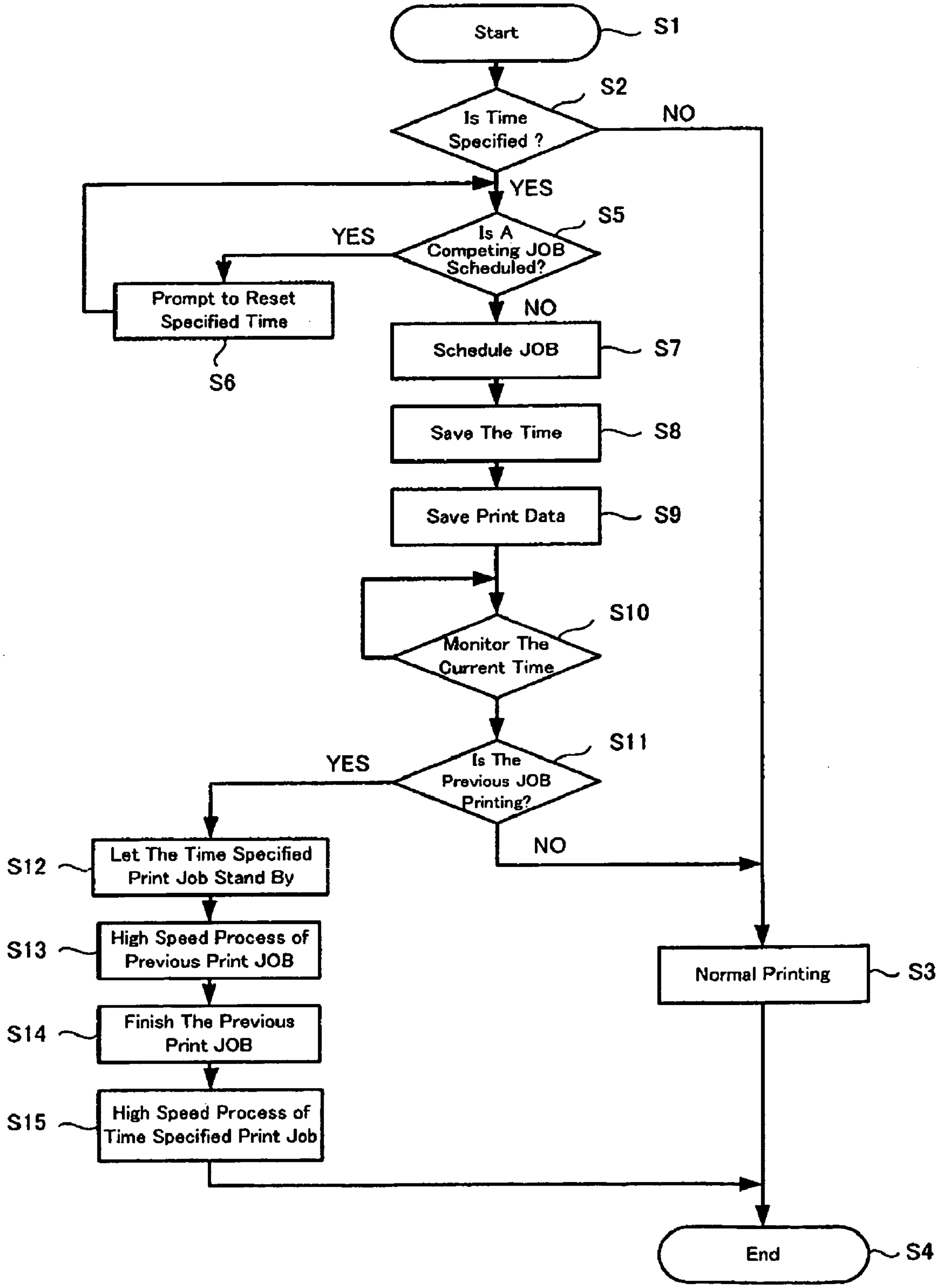
FIG. 7 is a flowchart for explaining the print process as time specified of the image forming apparatus in accordance with the embodiment of the present invention.

Step S1 of FIG. 7 is the start step of specifying printing time, and in this step the system controller 11 receives data from the client terminal PC 200 (FIG. 1) through the network I/F15. In step S2, it is judged whether or not a printing time is specified in the data from the system controller 11. If there is no printing time is specified, the data is stored in the storage unit 14 and transferred to the printer CPU 21 from the system controller 11, while paper is fed from the paper feed unit 40 under control of the paper feed control CPU 23 so that the print process is performed by the printer unit 20. This is a normal print step S3 in which printed paper is output through the finisher 50, followed by terminating the processing in step S4.

On the other hand, if there is a specified time, it is judged in step S5 by the system controller 11 whether or not the print jobs to be performed by the MFP 100 includes a competing print job timely overlapping the print job as time specified anew, and if it is confirmed that there is such a competing print by comparing the specified time with the print finish time of the competing print job, a request for resetting another specified printing time is transmitted to the client terminal PC 200 in step S6.

As a result of judgment in step S5, if there is no competing print job, the print job specifying a printing time is scheduled in step S7, the data indicative of the printing time is stored in the storage unit 14 in step S8, and the print data is stored in the storage unit 14 in step S9. The system controller 11 monitors the printing times for the jobs as scheduled in step S10, check the print jobs as scheduled at certain time intervals in order that the print process is prepared to start and finish the time specified print jobs as specified.

When the print start time of the time specified print job approaches, it is judged, in advance of starting the print process, whether or not the previous print job is being performed in step S11, and if not being performed, the print process is started in step S3 and finished as specified in step S4.

Conversely, if the previous print job is being performed in step S11 and thereby it is estimated that the print process as time specified may not be finished by the specified printing time, the time specified print job is let stand by in step S12, and the previous print job is performed by the high speed process in step S13. After the previous print job is finished in step S14, the time specified print job is performed by the high speed mode in step S15, followed by terminating the print process in step S4.

Incidentally, the print process in the high speed mode is used for both the previous print job and the time specified print job in the above example. However, depending upon the amount of time to spare, it may be possible to use the high speed mode only for one of the print jobs.

Meanwhile, the above high speed print job is only a temporary treatment in the case where a print process may not be finished by the printing time as specified, and therefore it is preferred that the print process is performed at the normal speed unless the high speed mode is required by time specified printing. Namely, if the print process were performed always in the high speed mode, while the print speed could be increased, there would be disadvantages that the apparatus might be jammed, that the power consumption might increase as the number of sheets to be processed increased, that heavy loads might be applied to the controlling CPUs, and that the resolution might be lowered. Accordingly, while the temporary use of the high speed print process is not so problematic, it should be avoided to always use the high speed mode.

As has been discussed above, in accordance with the image forming apparatus and the printing time specifying system of the present invention, it is possible that, when a previous print job is scheduled before time specified printing, a time specified print job can be finished by the time as specified without interrupting the print process of the previous print job to improve convenience of users.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications, and alterations should therefore be seen as within the scope of the present invention.

What is claimed is:

1. An image forming apparatus having a printing time specifying function, comprising:

a printer unit configured to print an image on paper, which is transferred from a paper feed unit, in either a normal print mode or a high speed print mode;

a time specifying processing unit configured to receive print data in which a printing time is specified, and schedule a printing time on the basis of the print data of said printing time; and a control unit configured to check the process schedule of the other print data in advance of starting the print process of the print data relating to the time specified printing, and perform at least one of the print process of the print data relating to the time specified printing and the print process of said other print data by switching a current print mode to the high speed print mode if it is estimated that the print process of the print data as time specified cannot be finished by said printing time.

2. An image forming apparatus as set forth in claim 1, further comprising a mechanism that prompts a user to reset another printing time if the process of another print data is scheduled to overlap the printing time of the time specified printing.

3. An image forming apparatus as set forth in claim 1, wherein the transfer interval of the paper as successively transferred from said paper feed unit in said high speed print mode is shorter than the transfer interval in said normal print mode.

4. An image forming apparatus as set forth in claim 1, wherein the transfer speed of the paper as successively transferred from said paper feed unit in said high speed print mode is higher than the transfer speed in said normal print mode.

5. An image forming apparatus as set forth in claim 1, wherein the operating clock frequency of said control unit in said high speed print mode is set to a higher value than that in said normal print mode.

6. An image forming apparatus as set forth in claim 1, further comprising a raster image processor (RIP) that processes print data, wherein the resolution of images to be processed by said RIP is lowered in the high speed print mode as compared with that in said normal print mode.

7. An image forming apparatus as set forth in claim 1, wherein said process schedule of the other print data is checked at predetermined intervals in order that the check interval becomes shorter as the time approaches when the print process of the print data relating to the time specified printing is to start.

8. A printing time specifying system having an image processing apparatus connected to an image forming apparatus through a network, and configured to perform a print process of the print data which is generated by said image processing apparatus by a time as specified by a user, said printing time specifying system comprising:

said image processing apparatus configured to generate print data and provided with an input unit through which a printing time of said print data is specified by inputting data of the printing time;

said image forming apparatus having a printer unit configured to print an image on paper, which is transferred from a paper feed unit, in either a normal print mode or a high speed print mode, and a control unit configured to check the process schedule of the other print data in advance of starting the print process of the print data relating to the time specified printing, and perform at least one of the print process of the print data relating to the time specified printing and the print process of said other print data by switching a current print mode to the high speed print mode if it is estimated that the print process of the print data as time specified cannot be finished by said printing time.

9. A printing time specifying system as set forth in claim 8, wherein said image processing apparatus is a PC (Personal Computer).

10. A printing time specifying system as set forth in claim 8, further comprising:

a mechanism that prompts a user to reset another printing time if the process of another print data is scheduled to overlap the printing time of the time specified printing.

11. A printing time specifying system as set forth in claim 8, wherein the transfer interval of the paper as successively transferred from said paper feed unit in said high speed print mode is shorter than the transfer interval in said normal print mode.

12. A printing time specifying system as set forth in claim 8, wherein the transfer speed of the paper as successively transferred from said paper feed unit in said high speed print mode is higher than the transfer speed in said normal print mode.

13. A printing time specifying system as set forth in claim 8, wherein the operating clock frequency of said control unit in said high speed print mode is set to a higher value than that in said normal print mode.

14. A printing time specifying system as set forth in claim 8, wherein said image forming apparatus further comprises a raster image processor (RIP) that processes print data, wherein the resolution of images to be processed by said RIP is lowered in the high speed print mode as compared with that in said normal print mode.

15. A printing time specifying system as set forth in claim 8, wherein said process schedule of the other print data is checked at predetermined intervals in order that the check interval becomes shorter as the time approaches when the print process of the print job relating to the time specified printing is to start.

16. A printing time specifying system as set forth in claim 8, wherein said image forming apparatus having a storage unit which stores the print data as generated by said image processing apparatus and the data of said printing time so that the print process of said print data is performed to finish by the printing time as input on the basis of the data of the printing time as stored.

* * * * *